Patented Jan. 19, 1943

2,308,845

UNITED STATES PATENT OFFICE 2,308,845

FOAM-TYPE FIRE EXTINGUISHER

Clifford B. White, Elmira, N. Y., assignor to American-La France-Foamite Corporation, Elmira, N. Y., a corporation of New York No Drawing. Application July 3, 1940, Serial No. 344,386

6 Claims. (Cl. 252—6.5)

The invention relates to so-called non-freeze fire extinguishers of the foam type, meaning an extinguisher capable, on the commingling of its contained chemicals, of producing and effectively discharging foam at all temperatures through the full range in which such apparatus is likely to be used, which may be taken as from $-15°$ F. upwards to say, $110°$ F. By foam is meant such as will float on burning oil and cling to vertical surfaces.

The problem in the production of a satisfactory extinguisher of this kind relates to the liquid chemicals with which the extinguisher is charged and is difficult by reason of the fact that the reaction of such liquids must not merely evolve gas abundantly at the lowest temperature, thus to give a quick and sufficient discharging pressure at that temperature, but also must not develop excessive pressures at the highest temperature, and in all cases must produce foam of the same quality and efficiency as obtained in standard foam extinguishers operating at normal room temperature, and by reason of the further fact that this operating capacity, for commercial reasons, must be obtained from a two-solution charge, not requiring special structural design of the extinguisher, so that such charge can be readily used in extinguishers already in service. While foam-type charges have been heretofore proposed, capable of operation at the lower end of the temperature range, so far as I am aware, none has thus far appeared that is capable also of operation at the upper end without excessive pressure development. Even if the pressure be not dangerously high it destroys the effectiveness of the discharged stream and the character of the foam of which it is composed.

I have discovered a combination of liquid reagents, suitable for substitution for the standard charge solutions, which react sufficiently promptly at the low end of the range and not too violently at the higher temperatures, which also preserve their efficiency for an indefinite period, and which therefore answer the problem in a satisfactory manner.

For the basic reagent, I use an aqueous solution of an alkali-metal carbonate, a freeze-point depressant, and any suitable stabilizer, usually the well-known secondary extract of licorice; other stabilizers can be used and I am not restricted to licorice and within the broad aspects of the invention the stabilizer can be incorporated in either solution.

As will be understood, the function of the basic solution is to constitute the source of carbon dioxide gas for inflating the foam bubbles and providing the expelling pressure, such gas being released from the solution by the effect of the chemical reaction; also the basic solution provides water for hydrolyzing the other charge component as presently referred to, and for constituting the films that make the bubble walls.

As an example, a satisfactory basic solution, for a standard 2½ gallon foam extinguisher, may be made up as follows:

| | |
|---|---|
| $KHCO_3$ (potassium bicarbonate) _pounds__ | 1¾ |
| Water ___quarts__ | 4½ |
| Ethylene glycol ___do____ | 3 |
| Licorice (secondary extract) 18 Bé__pint__ | ½ |
| (or powdered secondary extract_ounces__ | 2½) |

The bicarbonate is first dissolved in the water and the glycol and stabilizer then successively added. In place of ethylene glycol, glycerine or any other freeze-point depressant can be substituted provided it does not objectionably affect the bicarbonate or any other component. While other alkali-metal carbonates, such as sodium bicarbonate, might be used, I prefer the potassium salt because of its high solubility which permits the use of less carbonate solution and more glycol to make a given volume.

For the companion solution, constituting the acid-reactive component of the charge, I use one of the class of inorganic halides having rapid hydrolizing properties and high heats of solution, and in amount about 20% greater than the molecular equivalent of the bicarbonate. The halide radical has a strong preferential affinity for the metal base of the bicarbonate, thereby releasing the carbon dioxide gas. The reaction is accompanied by the liberation of much internal energy causing very rapid reaction. This chemical energy is needed at sub-zero temperatures, but is objectionable at higher temperatures because it causes too rapid and violent reaction. I have found, however, that by suitably diluting such reagent it is possible to moderate the reaction speed at the higher temperature, so as to avoid excessive pressure, and yet retain a sufficient effect at the lowest temperature to bring about a prompt gas release and proper foam production.

The diluent is selected from those aqueous liquids which will make a solution non-freezing in the temperature range, and which is relatively bulky, so that on inversion of the extinguisher the active halide will permeate quickly throughout the whole body of the companion solution. Generally speaking, the diluted reagent should not be less than about ⅓ the volume of the companion solution, as this makes the greatest volume of foam. By selection of the proper amount of diluent of the kind referred to, the halide reagent can be made to give a satisfactory rate of gas release at both ends of the temperature range.

For the acid reagent, those halides are preferred which yield by the reaction, a voluminous colloidal, slimy, or gelatinous, precipitate, because such a constituent lends strength to the bubble film, making the foam more enduring, and I find that all of the following salts have this property to a greater or less extent: $AlCl_3$, $SnCl_4$, $SiCl_4$, $TiCl_4$, and $SbCl_5$, of which I prefer to use stannic chloride because it has this property in a very satisfactory degree and is also desirable for the reasons that it is readily available, it is a common chemical manufactured in large quantities and used in the arts and it is comparatively inexpensive. Tin salts are also non-toxic. Tin salts have a fire inhibiting (or fireproofing) action in their own right exclusive of their use in a fire foam.

For the diluent of the acid reagent, or specifically the stannic chloride, I have found aqueous solutions of either $MgCl_2$, $ZnCl_2$ or $CaCl_2$ are operative and that calcium chloride is specially efficient. Also it is substantially inert to its surroundings and yields no solids or semi-solids to obstruct the extinguisher passages.

An example of a suitable acid-reactive charge component for use with the basic compound above given is as follows:

$SnCl_4$ (stannic chloride) _____ fluid ounces__ 8.6
Diluted with:
$CaCl_2$ (calcium chloride) _____ ounces__ 14
in water _____ pints__ 2½

The formulas herein stated are suited in amount for the standard 2½ gal. foam extinguisher, the solutions being placed, basic and acid respectively, in the outer and inner compartments of the extinguisher. Neither solution will freeze in the range stated. On the dispersion of one in the other, as on the inversion of the extinguisher, and even at the lowest temperature, reaction occurs promptly and in accordance with the following equations:

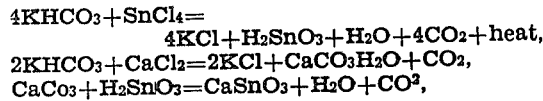

$4KHCO_3 + SnCl_4 =$
$\quad 4KCl + H_2SnO_3 + H_2O + 4CO_2 + heat$,
$2KHCO_3 + CaCl_2 = 2KCl + CaCO_3H_2O + CO_2$,
$CaCo_3 + H_2SnO_3 = CaSnO_3 + H_2O + CO^2$, the glycol and the stabilizer being unaffected. The liquid in the bubble walls contains the non-gaseous reaction products and, as stated, produces good, durable foam like that obtained from standard foam extinguishers. The reaction occurs promptly at the lower end of the temperature range, and without violence or excessive pressure at the top of the range, thus providing an extinguisher which is useful in unprotected locations in all climates.

I claim:

1. A foam extinguisher charge comprising as a basic component an aqueous solution of alkali-metal carbonate associated with an inert freeze-point depressant, and an acid component selected from the group consisting of $AlCl_3$, $SnCl_4$, $SiCl_4$, $TiCl_4$, and $SbCl_5$, and diluted with an aqueous solution of a non-hydrolyzing inorganic halide, and a foam stabilizer in one of said components.

2. A foam extinguisher charge comprising a basic component consisting of an aqueous solution of alkali-metal bi-carbonate having a sub-zero freeze-point, and a companion charge component containing $SnCl_4$, and a foam stabilizer incorporated in one of said components.

3. A foam extinguisher charge comprising as one component, an aqueous solution of alkali metal bi-carbonate, a freeze-point depressant, and a foam-stabilizer, and diluted stannic chloride as the other component having also a sub-zero freeze-point.

4. A foam extinguisher charge comprising as a basic component an aqueous solution of alkali-metal carbonate associated with a freeze-point depressant, and a companion component comprising $TiCl_4$, and a foam stabilizer in one of said components.

5. A foam extinguisher charge comprising as a basic component an aqueous solution of alkali-metal carbonate associated with an inert freeze-point depressant, and an acid component selected from the group consisting of $AlCl_3$, $SnCl_4$, $SiCl_4$, $TiCl_4$ and $SbCl_5$, the same being present in amount about 20% greater than the molecular equivalent of the carbonate and diluted with an aqueous solution of a non-hydrolyzing inorganic halide and a foam stabilizer in one of said components.

6. A foam extinguisher charge comprising as a basic component an aqueous solution of alkali-metal carbonate associated with an inert freeze-point depressant, and an acid component selected from the group consisting of $AlCl_3$, $SnCl_4$, $SiCl_4$, $TiCl_4$ and $SbCl_5$, the same being present in amount about 20% greater than the molecular equivalent of the carbonate and diluted to a volume of about ⅓ that of the basic solution and a foam stabilizer in one of said components.

CLIFFORD B. WHITE.